(12) United States Patent
Elgie et al.

(10) Patent No.: US 7,626,356 B2
(45) Date of Patent: Dec. 1, 2009

(54) MODULAR POWER SUPPLY COMPRISING AN AC MODULE, DC MODULE AND AN ELECTRIC CHARGE STORAGE MODULE

(75) Inventors: Richard James Elgie, Irvine, CA (US); Barry Sween, Santa Monica, CA (US); Vijendra Nalwad, Newbury Park, CA (US); Greg Dawson, Huntsville, AL (US)

(73) Assignee: Belkin International, Inc., Compton, CA (US)

( * ) Notice: Subject to any disclaimer, the term of this patent is extended or adjusted under 35 U.S.C. 154(b) by 303 days.

(21) Appl. No.: 11/650,021

(22) Filed: Jan. 5, 2007

(65) Prior Publication Data
US 2008/0164757 A1    Jul. 10, 2008

(51) Int. Cl.
*H02J 7/00* (2006.01)
(52) U.S. Cl. .................................. 320/107; 320/103
(58) Field of Classification Search ......... 320/111–114, 320/127–128, 137–138, 107; 361/790, 735, 361/301.4; 307/18, 22, 26
See application file for complete search history.

(56) References Cited

U.S. PATENT DOCUMENTS

| | | | |
|---|---|---|---|
| 2,143,529 A | 1/1939 | White |
| 2,721,624 A | 10/1955 | Osborn |
| 3,000,384 A | 9/1961 | Piers |
| 3,009,235 A | 11/1961 | Mestral |
| 3,152,219 A | 10/1964 | Murray et al. |
| 3,197,830 A | 8/1965 | Hoadlay |
| 3,275,969 A | 9/1966 | Sheeran |
| 3,279,008 A | 10/1966 | Wallach |
| 3,307,872 A | 3/1967 | Murcott |
| 3,426,363 A | 2/1969 | Girard |
| 3,601,863 A | 8/1971 | Dorsey |
| 3,835,505 A | 9/1974 | Shewbridge |
| 3,947,927 A | 4/1976 | Rosenthal |
| 3,973,610 A | 8/1976 | Ballin |
| 3,990,454 A | 11/1976 | Schlesinger |
| 4,067,526 A | 1/1978 | Storer |
| 4,149,540 A | 4/1979 | Hasslinger |
| 4,182,005 A | 1/1980 | Harrington |
| 4,273,130 A | 6/1981 | Simpson |
| 4,289,366 A | 9/1981 | Marks |
| 4,569,348 A | 2/1986 | Hasslinger |
| 4,609,171 A | 9/1986 | Matsui |
| 4,647,139 A | 3/1987 | Yang |

(Continued)

OTHER PUBLICATIONS

Buyshipdirect.com; Universal Power Bank; BuyShipDirect.com: Product Detail; 3 pages.

(Continued)

*Primary Examiner*—Edward Tso
*Assistant Examiner*—Ahmed Omar
(74) *Attorney, Agent, or Firm*—Bryan Cave LLP

(57) ABSTRACT

An electrical component (100) includes: (a) an electrical charge storage component (110) comprising one or more first power connectors (211); (b) a first power component (130) capable of outputting alternating current to a first electrical device and comprising one or more second power connectors (412); and (c) a second power component (150) capable of outputting direct current to a second electrical device and comprising one or more third power connectors (612).

43 Claims, 10 Drawing Sheets

U.S. PATENT DOCUMENTS

| | | |
|---|---|---|
| 4,802,638 A | 2/1989 | Burger et al. |
| 4,815,172 A | 3/1989 | Ward |
| 4,893,381 A | 1/1990 | Frankel |
| 4,939,818 A | 7/1990 | Hahn |
| 4,940,427 A | 7/1990 | Pearson |
| 5,024,402 A | 6/1991 | Hamel |
| 5,040,263 A | 8/1991 | Guhne et al. |
| 5,048,158 A | 9/1991 | Koerner |
| 5,071,367 A | 12/1991 | Luu |
| 5,133,671 A | 7/1992 | Boghosian |
| 5,168,603 A | 12/1992 | Reed |
| 5,176,343 A | 1/1993 | Cheney, II et al. |
| 5,236,371 A | 8/1993 | Matthis |
| 5,326,283 A | 7/1994 | Chen |
| 5,388,155 A | 2/1995 | Smith |
| 5,394,592 A | 3/1995 | Quick |
| 5,502,877 A | 4/1996 | Yocum |
| 5,507,667 A | 4/1996 | Hahm et al. |
| 5,697,809 A | 12/1997 | Chung |
| 5,720,628 A | 2/1998 | Usui et al. |
| 5,802,676 A | 9/1998 | Tolan |
| 5,806,943 A | 9/1998 | Dell et al. |
| 5,812,683 A | 9/1998 | Parker et al. |
| D400,175 S | 10/1998 | Okamoto |
| 5,906,506 A | 5/1999 | Chang et al. |
| 5,923,147 A | 7/1999 | Martensson |
| 5,984,224 A | 11/1999 | Yang |
| D428,327 S | 7/2000 | Stekelenburg |
| 6,109,958 A | 8/2000 | Ke |
| 6,164,582 A | 12/2000 | Vara |
| 6,331,936 B1 | 12/2001 | Hom et al. |
| 6,427,290 B1 | 8/2002 | Liu |
| 6,428,348 B1 | 8/2002 | Bean |
| 6,433,274 B1 | 8/2002 | Doss et al. |
| 6,567,277 B1 | 5/2003 | Doherty et al. |
| 2005/0031944 A1* | 2/2005 | Sodemann et al. .......... 429/150 |
| 2007/0182368 A1* | 8/2007 | Yang .......................... 320/110 |
| 2007/0273325 A1* | 11/2007 | Krieger et al. .............. 320/106 |

OTHER PUBLICATIONS

Buyshipdirect.com; Portable Electronics Power Bank; BuyShipDirect.com: Product Detail; 3 pages.

Buyshipdirect.com; Notebook Power Bank; BuyShipDirect.com: Product Detail; 3 pages.

WalMart Music Power Universal AC Charger for iPod and MP3 Players; www.walmart.com/catalog/product.do?productid=4662217; 5 pages.

* cited by examiner

MODULAR POWER SUPPLY COMPRISING AN AC MODULE, DC MODULE AND AN ELECTRIC CHARGE STORAGE MODULE

FIELD OF THE INVENTION

This invention relates generally to electrical devices, and relates more particularly to electrical components capable of providing power and methods of using the same.

BACKGROUND OF THE INVENTION

Many electrical devices today include multiple input power connectors. For example, some portable computers can receive power through an alternating current (AC) power connector, or a direct current (DC) power connector. Some portable computers can also receive power through universal serial bus (USB) connectors.

While some electrical devices include multiple input power connectors, the power supplies or power converters can connect to only one type of power source. For example, an AC to DC adapter requires an AC power source, and a DC to AC inverter requires a DC power source. The AC to DC adapter cannot be powered by a DC power source (other than a battery), and similarly, the DC to AC inverter cannot be powered by an AC power source.

Thus, a need exists for an electrical component that provides a variety of interchangeable alternatives for providing power to electrical devices.

BRIEF DESCRIPTION OF THE DRAWINGS

The invention will be better understood from a reading of the following detailed description, taken in conjunction with the accompanying figures in the drawings in which.

Figure 1:
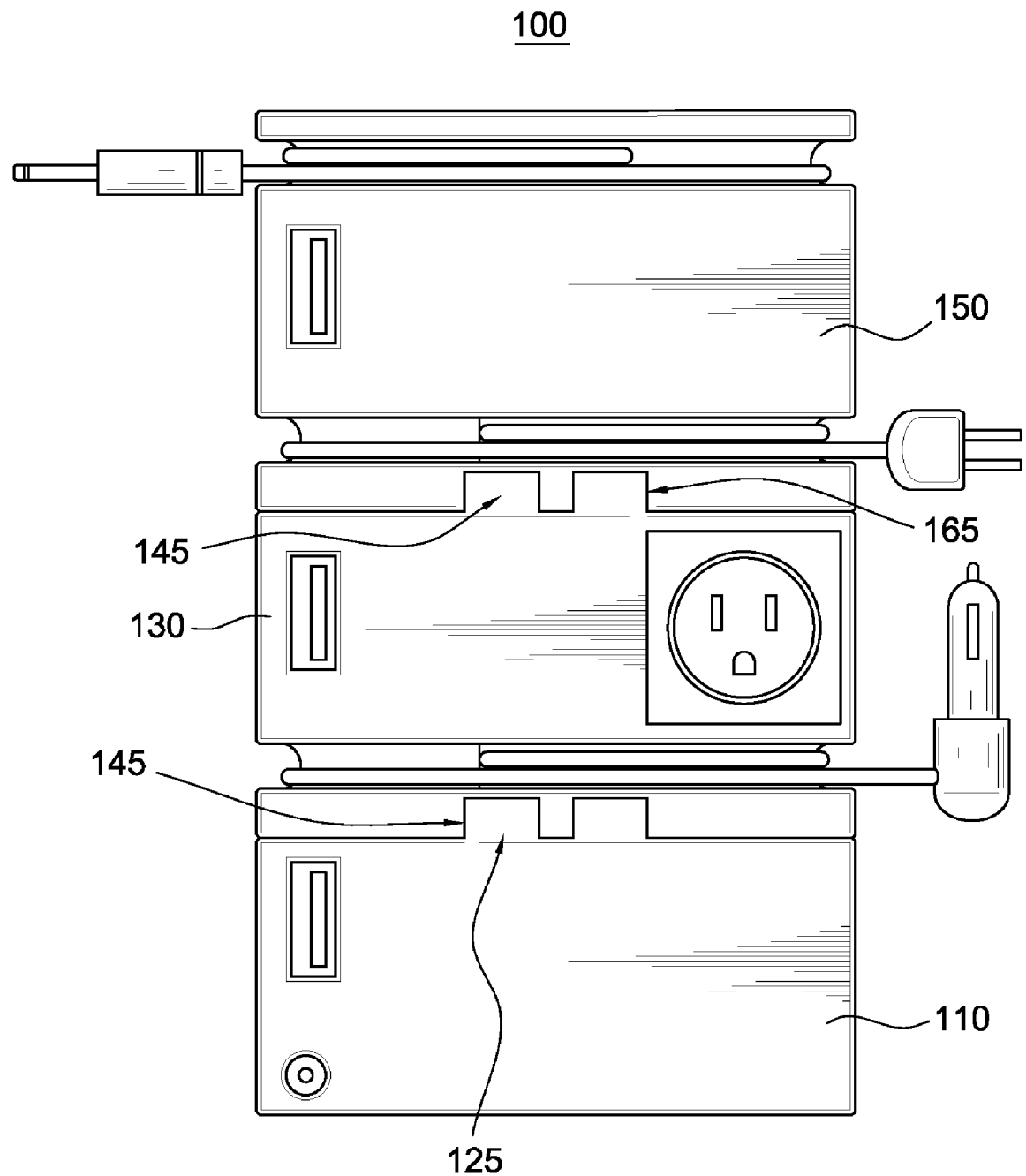
FIG. 1 illustrates a side view of an electrical component having an electrical charge storage component, a first power component, and a second power component, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," and "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, physically, mechanical, or other manner. The term "on," as used herein, is defined as in, on, or otherwise adjacent to.

DETAILED DESCRIPTION OF EXAMPLES OF EMBODIMENTS

In one embodiment, an electrical component includes: (a) an electrical charge storage component having one or more first power connectors; (b) a first power component capable of outputting alternating current to a first electrical device and having one or more second power connectors; and (c) a second power component capable of outputting direct current to a second electrical device and having one or more third power connectors. In this embodiment, the electrical charge storage component is capable of outputting power through the one or more first power connectors to the first power component or the second power component. The first power component is further capable of receiving power from the electrical charge storage component or the second power component through the one or more second power connectors. The second power component is further capable of receiving power from the electrical charge storage component or the first power component through the one or more third power connectors.

In a further embodiment, a method of using an electrical component includes: (a) providing an electrical charge storage component; (b) providing a first power component capable of providing alternating current to a first electrical device; (c) providing a second power component capable of providing direct current to a second electrical device; (d) coupling the electrical charge storage component to the first power component; and (e) coupling the first power component to the second power component.

Turning to the drawings, FIG. 1 illustrates a side view of an electrical device or component 100, according to a first embodiment. Component 100 is merely exemplary and is not limited to the embodiments presented herein. Component 100 can be employed in many different embodiments not specifically depicted or described herein.

As an example, component 100 can includes: (a) a power component 130 capable of outputting alternating current to a first electrical device (not shown) and having a coupling mechanism 145; (b) a power component 150 capable of outputting direct current to a second electrical device (not shown) and having a coupling mechanism 165; and (c) an electrical charge storage component 110 having a coupling mechanism 125. In the embodiment shown in FIG. 1, power component 130 is removably coupled to power component 150 and storage component 110. In this example, component 100 can provide power from storage component 110 to the first and/or second devices through power components 130 and 150, respectively. The configuration of component 100 shown in FIG. 1 is only exemplary of many possible configurations of storage component 110 and power components 130 and 150.

Figure 2:
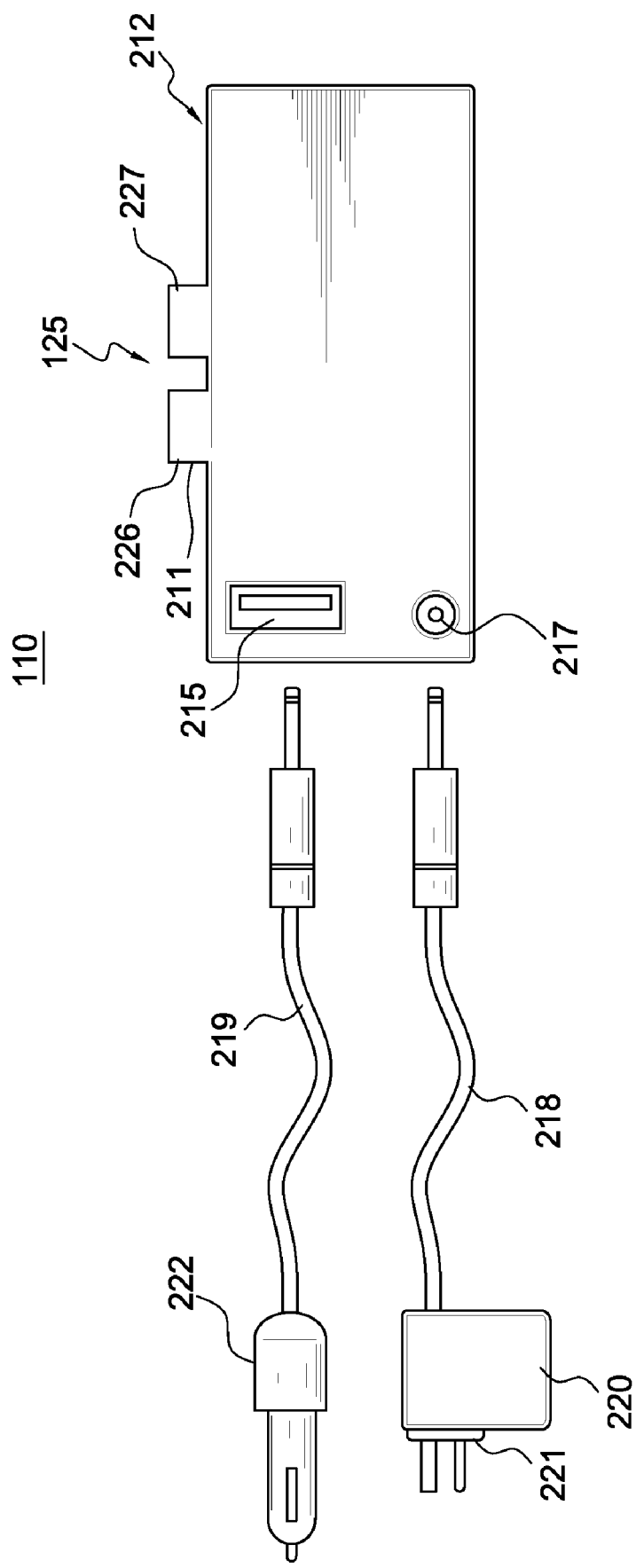
FIG. 2 illustrates a front view of the electrical charge storage component of FIG. 1, according to the first embodiment.
Figure 3:
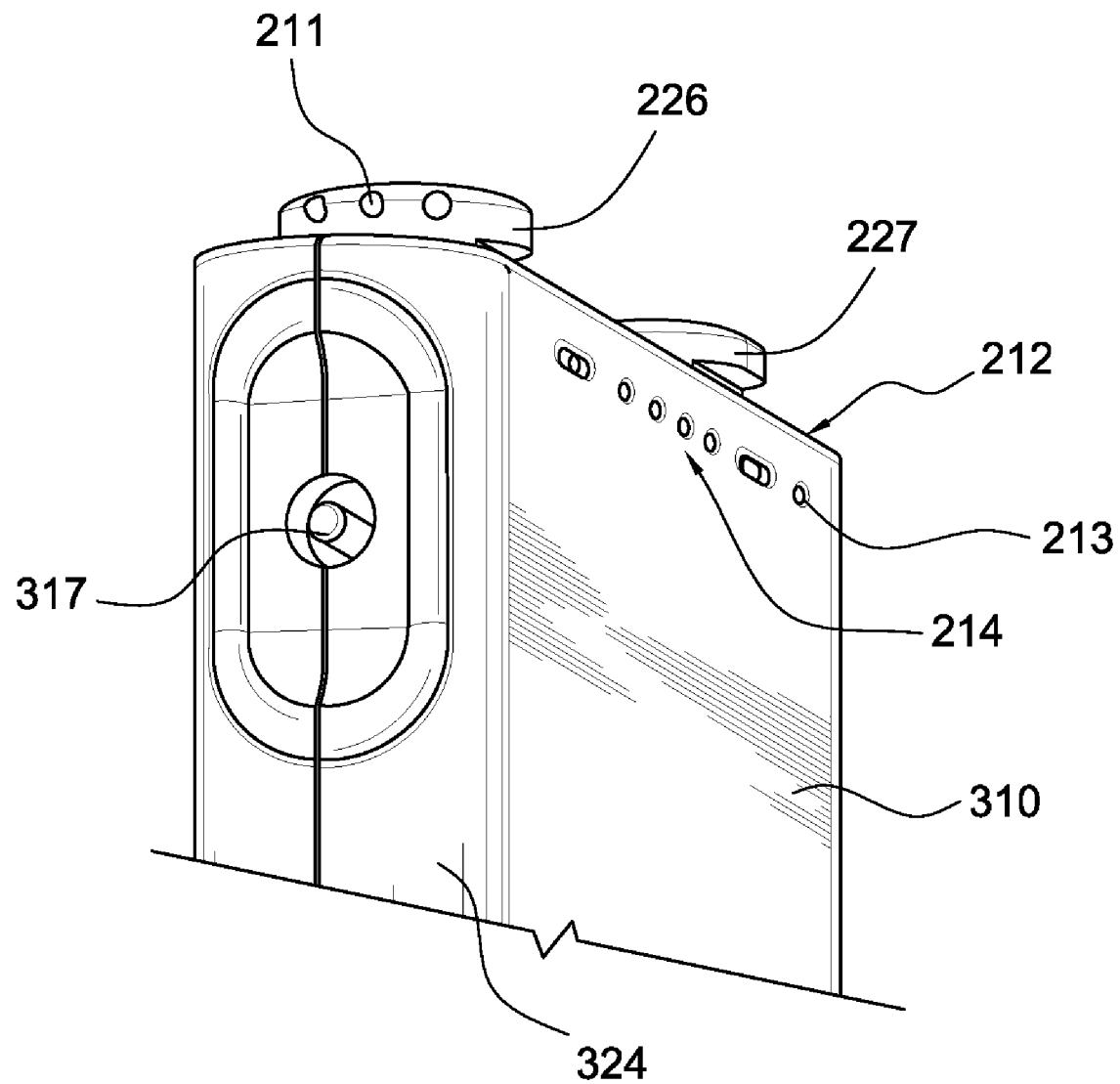
FIG. 3 illustrates a partial top, side, front isometric view of another electrical charge storage component, according to another embodiment.

FIG. 2 illustrates a front view of storage component 110, according to the first embodiment. FIG. 3 illustrates a partial top, side, front isometric view of an electrical charge storage component 310, according to another embodiment. In one example, storage component 110 is capable of storing electrical power and outputting power to power components 130 and 150. Storage component 310 is identical to storage component 110 except for the differences noted herein. Storage component 110 can include: (a) coupling mechanisms 125; (b) at least one input connector 217 capable of receiving power from a power source; and (c) at least one USB connector 215. In one example, storage component 110 can be a battery. Input connector 317 is substantially similar to input connector 217, except it is located on side 324 of storage component 310. The design and the manufacturing process for a battery is well-know in the art and will not be described herein.

In one embodiment, coupling mechanism 125 is capable of coupling storage component 110 to power components 130 and 150. In one example, coupling mechanism 125 can electrically couple storage component 110 to power components 130 and 150. In the same or a different embodiment, coupling mechanism 125 can physically couple storage component 110 to power components 130 and 150.

In the embodiments shown in FIGS. 2 and 3, coupling mechanism 125 includes: (a) one or more connecting heads 226 and 227; and (b) at least one power connector 211. In this example, connecting heads 226 and 227 protrude from a top side 212. In other embodiments, connecting heads 226 and 227 can protrude from other sides of storage component 110. In some examples, connecting heads 226 and 227 are identical. In other examples, connecting heads 226 and 227 can have different shapes. In some embodiments, power connector 211 is on connecting head 226. In other embodiments, power connector 211 is on connecting head 227. In alternative embodiments, power connector 211 is located apart from the connecting heads 226 and 227.

Storage component 110 is capable of providing power to power components 130 and 150 through coupling mechanism 125. In one example, storage component 110 provides power through power connector 211 to power components 130 or 150. In one embodiment, storage component 110 provides DC power to power components 130 and 150.

Input connector 217 is capable of receiving power from a power source to charge or recharge storage component 110, to provide the power outputted from storage component 110 to power component 130 while coupling mechanisms 125 and 145 are electrically coupled together, and to provide the power outputted from storage component 110 to power component 130 while power connectors 130 and 150 are electrically coupled together. In the same or a different embodiment, the power received through input connector 217 can be supplied to the first and second electrical devices through power components 130 and 150, respectively.

A power source is an entity capable of supplying AC and/or DC power to input connector 217. Examples of power sources include generators, cigarette lighters in a car, backup battery units, computers, and electrical wall outlets.

In the examples shown in FIGS. 2 and 3, input connector 217 is a DC power input connector and can be coupled to either an AC power cord 218 or a DC power cord 219. AC power cord 218 includes an AC-to-DC transformer 220, which converts the AC power received by AC connector 221 into DC power. In one example, DC power cord 219 includes a DC connector 222 capable of being coupled to a cigarette lighter of a car.

In one example, USB connector 215 is capable of outputting direct current to a third electrical device. In some examples, the third electrical device can be the same as the first or second electrical devices. In other embodiments, storage component 110 is capable of receiving power through USB connector 215. In one example, the power received through the USB connector 215 can charge storage component 110. In an alternative embodiment, USB connector 215 can receive power from a power source and storage component 110 can output the power to power components 130 and 150 through coupling mechanism 125. In alternative embodiments, storage component 110 does not include input connector 217. In yet another embodiment, storage components 110 does not include USB connector 215.

In the embodiment shown in FIG. 3, storage component 310 can also include an power switch 213 capable of turning on or off storage component 310 and a meter 214 capable of displaying the amount of electrical charge stored in storage component 310.

Figure 4:
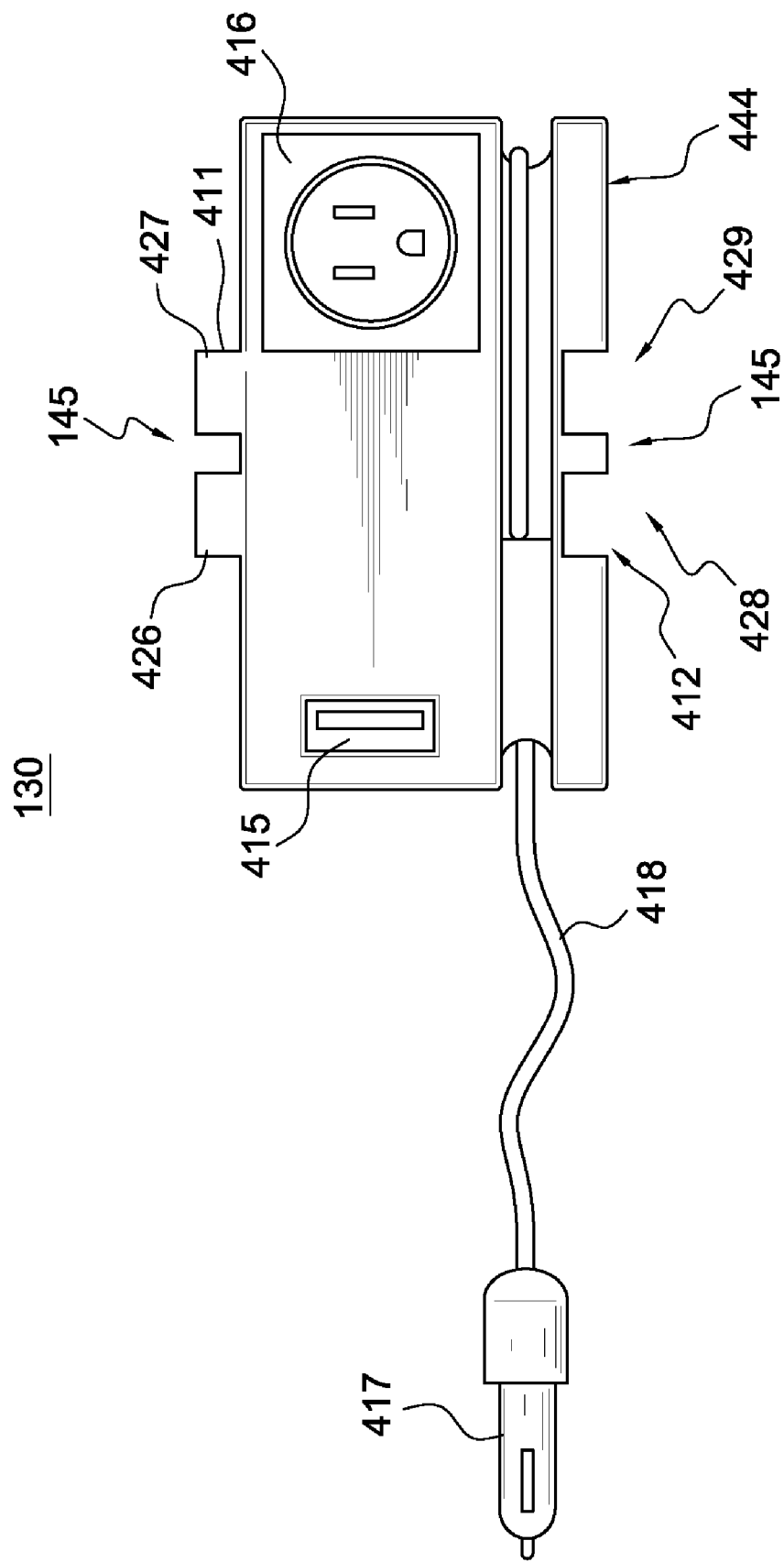
FIG. 4 illustrates a front view of a first power component of FIG. 1, according to the first embodiment.
Figure 5:
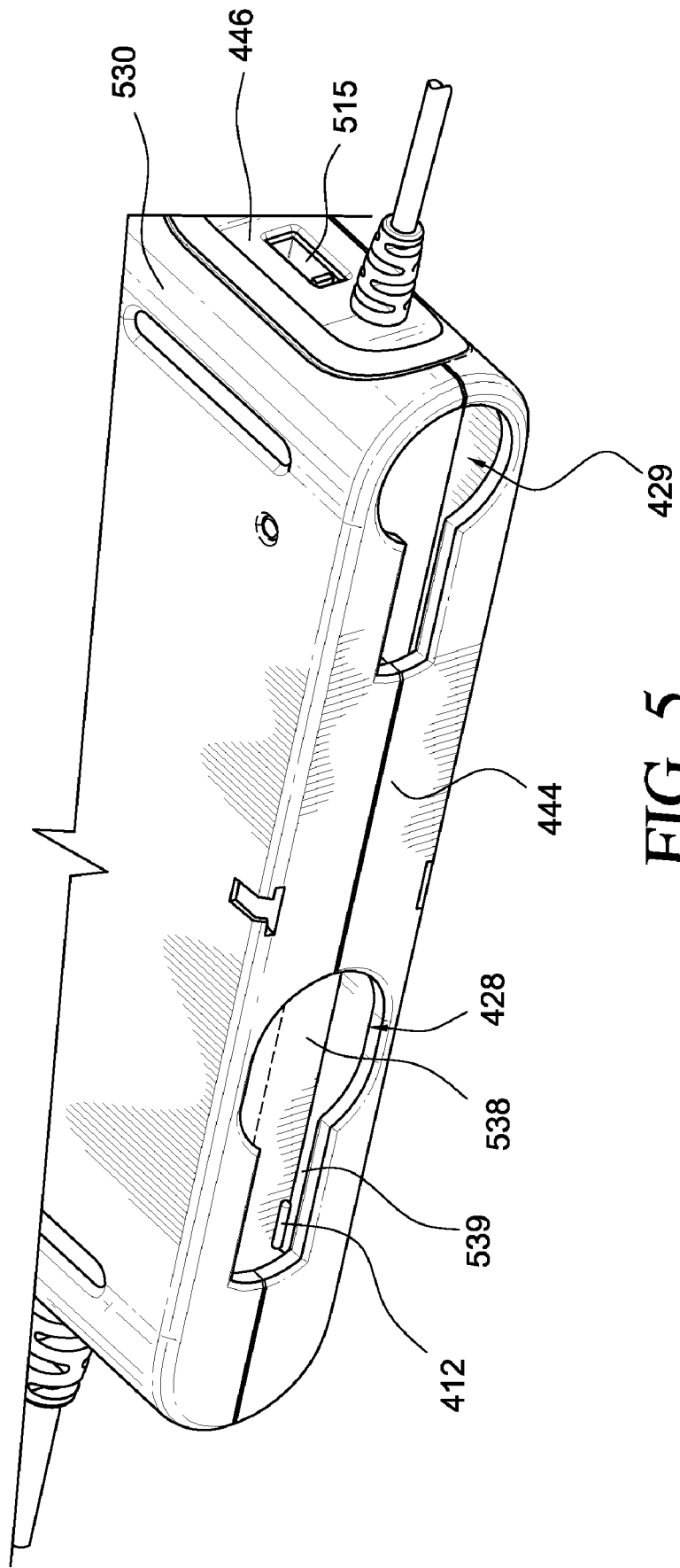
FIG. 5 illustrates a partial top, front, side isometric view of an alternative first power component, according to another embodiment.

FIG. 4 illustrates a front view of power component 130, according to the first embodiment. FIG. 5 illustrates a partial top, front, side isometric view of a power component 530, according to another embodiment. Power component 530 is identical to power component 130 except for the differences noted herein. In one example, power component 130 can provide alternating current to a first electrical device (not shown) and receive power from storage component 110 (FIG. 2) or power component 150 (FIG. 1). Power component 130 can include: (a) coupling mechanism 145; (b) at least one output connector 416; (c) at least one input connector 417 capable of receiving power from a power source; and (d) at least one USB connector 415.

In one example, power component 130 is an inverter and capable of converting DC power provided by storage component 110 (FIG. 2), power component 150 (FIG. 1), or input connector 417 into alternating current and outputting the alternating current to the second electrical device. The design and manufacturing process of an inverter is well-know in the art and will not be described herein.

Coupling mechanism 145 is capable of coupling power component 130 to storage component 110 (FIG. 2) and power component 150 (FIG. 1). In one example, coupling mechanism 145 can physically couple power component 130 to storage component 110 (FIG. 2) and power component 150 (FIG. 1). In the same or a different example, coupling mechanism 145 can electrically couple power component 130 to storage component 110 (FIG. 2) and power component 150 (FIG. 1).

In the embodiments shown in FIGS. 4 and 5, coupling mechanism 145 can include: (a) one or more connecting heads 426 and 427; (b) at least one power connector 411; (c) one or more receiving portions 428 and 429; and (d) at least one power connector 412. In one embodiment, connecting heads 426 and 427 are identical or substantially similar to connecting heads 226 and 227 (FIG. 2). Likewise, power connector 411 can be identical or substantially similar to power connector 211 (FIG. 2).

Receiving portions 428 and 429 can be recesses located in bottom side 444 of body 423. In other embodiments, receiving portions 428 and 429 are located on other sides of body 423. Receiving portions 428 and 429 are designed such that connecting heads 226 and 277 (FIG. 2) can be inserted and securely locked into receiving portions 428 and 429, respectively.

Power component 130 is capable of providing power to power component 150 (FIG. 1) and storage component 110 (FIG. 2) through coupling mechanism 145. In one example, power component 130 outputs and/or receives power through power connectors 411 and/or 412. In one embodiment, power component 130 receives and/or provides DC power through power connectors 411 and/or 412 to power component 150 (FIG. 1) and/or storage component 110 (FIG. 2).

In the illustrated example, receiving portions 428 and 429 include: (a) circular entry regions 538; and (b) rectangular locking regions 539. Circular entry regions 538 allow connecting heads 226 and 227 (FIG. 2) to enter receiving portions 428 and 429, respectively. After inserting connecting heads 226 and 227 (FIG. 2) into circular entry regions 538, storage component 110 (FIG. 2) can be shifted in a first direction toward power connector 412 to physically couple storage component 110 (FIG. 2) to power connector 130.

In non-illustrated embodiment, receiving portions 428 and 429 can include one or more bumps that can be coupled to one or more recesses on connecting heads 226 and 227 (FIG. 2) to securely couple power component 130 to storage component 110 (FIG. 2). In other embodiments, other designs for receiving portions 428 and 429 and connecting heads 226 and 227 (FIG. 2) can be used so long as the designs allow coupling of receiving portions 428 and 429 to connecting heads 226 and 227 (FIG. 2).

In one embodiment, power connector 412 is located on receiving portion 428 and power connector 211 is located on connecting head 426. In this embodiment, when receiving portions 428 and 429 are physically coupled to connecting heads 226 and 227 (FIG. 2), power connector 211 is self-aligned to be electrically coupled to power connector 412.

Output connector 416 can be coupled to the first electrical device and provide alternating current to the first electrical device. In the embodiments shown in FIGS. 4 and 5, output connector 416 is a female connector. In other embodiments, output connector 416 can be a male connector. In some embodiments, output connector 416 is removably coupled to power component 130 and can be removed and replaced with other AC power output connectors.

Input connector 417 provides DC power to power component 130. In one example, input connector 417 receives DC power from a power source and this DC power is converted to alternating current and the alternating current is outputted from power component 130. In the illustrated embodiment, input connector 417 is a DC connector capable of being coupled to a car's cigarette lighter. Input connector 417 is coupled to body 423 through a cable 418. In other embodiments, input connector 417 is on body 423 and can be coupled directly to a power source or coupled through a detachable cable. In the same or a different embodiment, input connector 217 is another type of DC connector.

USB connectors 415 can be identical or substantially similar to USB connector 215 (FIG. 2). USB connector 515 is identical to USB connector 415 except USB connector 515 is located on side 446. In one embodiment, power component 130 receives DC power from a power source through USB connector 415 and coverts the DC power into alternating current and outputs the alternating current to the first electrical device. In another embodiment, power component 130 receives power through USB connector 415 and can provide the power to storage component 110 (FIG. 2) and/or power component 150 (FIG. 1) through power connectors 411 and/or 412.

Figure 6:
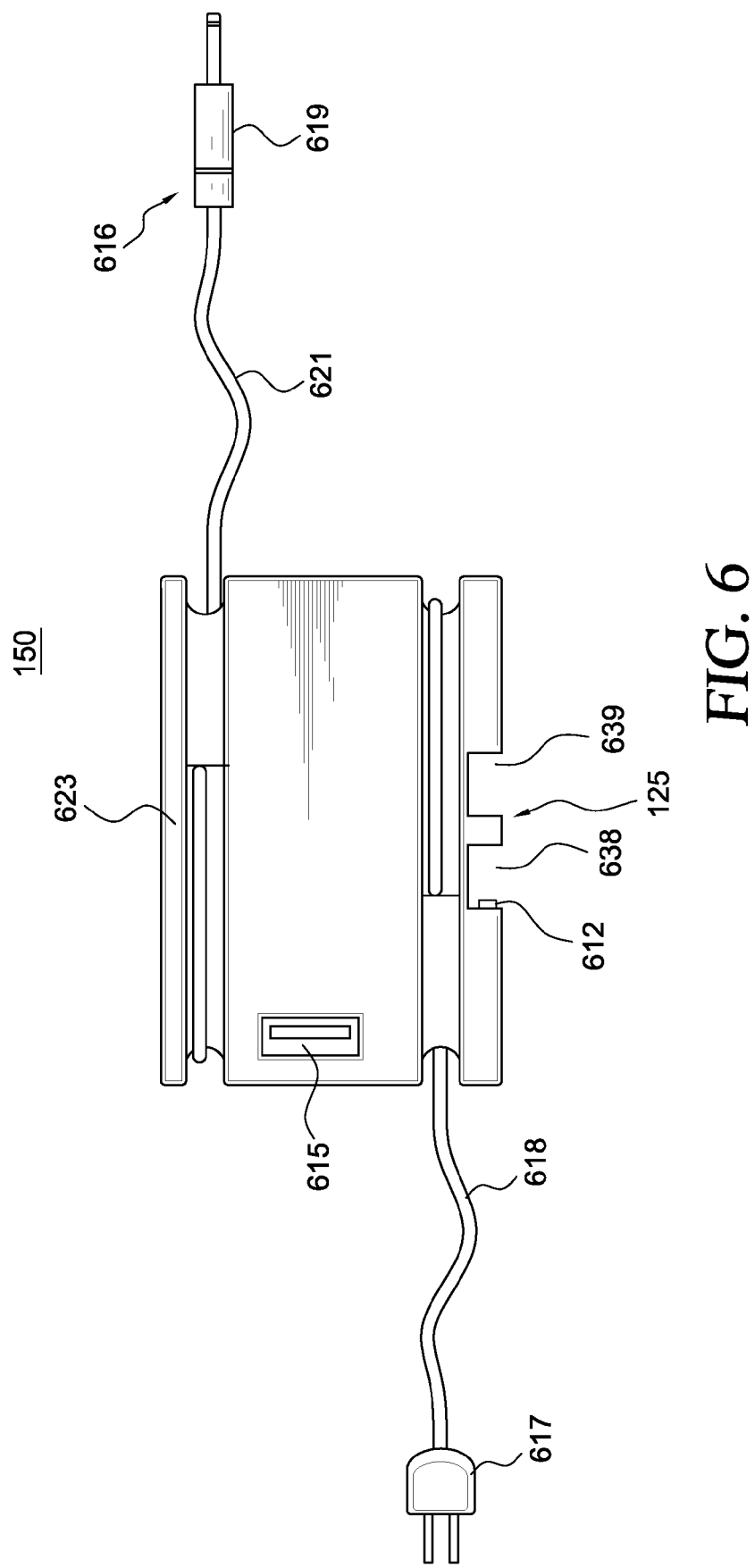
FIG. 6 illustrates a front view of a second power component of FIG. 1, according to the first embodiment.

FIG. 6 illustrates a front view of a power component 150, according to the first embodiment. Power component 150 can provide DC power to the second electrical device and receive power from storage component 110 (FIG. 2) or power component 130 (FIG. 4). In one example, power component 150 can include: (a) coupling mechanism 165; (b) at least one output connector 616 capable of providing direct current to the second electrical device; (c) at least one input connector 617 capable of receiving power from a power source; and (d) at least one USB connector 615. In one embodiment, power component 150 is an AC-to-DC adapter and capable of converting alternating current to direct current and providing the direct current to the second electrical device. The design and manufacturing process for an AC-to-DC adapter is well-know in the art and will not be described herein.

Coupling mechanism 165 is capable of coupling power component 150 to storage component 110 (FIG. 2) and power component 130 (FIG. 4). In one example, coupling mechanism 165 can physically couple power component 150 to storage component 110 (FIG. 2) and power component 130 (FIG. 4). In the same or a different example, coupling mechanism 165 can electrically couple power component 150 to storage component 110 (FIG. 2) or power component 130 (FIG. 4).

In one example, coupling mechanism 165 can include: (a) one or more receiving portions 638 and 639; and (b) at least one power connector 612. In one embodiment, receiving portions 638 and 639 are identical or substantially similar to receiving portions 428 and 429 (FIG. 4), respectively. Power connector 612 can be identical or substantially similar to power connector 412 (FIG. 4). Receiving portions 638 and 639 can be physically coupled to connecting heads 226 and 227 (FIG. 2) or connecting heads 426 and 427 (FIG. 4), respectively.

Power component 150 is capable of providing power to power component 130 (FIG. 4) and storage component 110 (FIG. 2) through coupling mechanism 165. In one example, power component 150 is capable of outputting and/or receiving power through power connector 612 from power component 130 (FIG. 4) and storage component 110 (FIG. 2). In one embodiment, power component 150 receives and/or provide DC power through power connector 612.

In one example, power connector 612 can be located on receiving portion 638. In this example, when receiving portions 638 and 639 are physically coupled to connecting heads 226 and 227 (FIG. 2) or connecting heads 426 and 427 (FIG. 4), power connector 612 is self-aligned to be electrically coupled to power connector 211 (FIG. 2) or power connector 411 (FIG. 4), respectively. In other examples, power connector 612 is not located on receiving portion 638 or 639.

In an alternative embodiment, coupling mechanism 165 can further include one or more connecting heads. In this embodiment, the connecting heads on power component 150 can be identical or substantially similar to connecting heads 226 and 227 (FIG. 2) or connecting heads 426 and 427 (FIG.

4). In the same or a different embodiment, the connecting heads on power component 150 can include one or more power connectors identical to or substantially similar to power connector 211 (FIG. 2) or power connector 411 (FIG. 4).

In one example, output connector 616 can be coupled to the second electrical device and provide direct current to the second electrical device. In the illustrated embodiment, output connector 616 is coupled to body 623 through a cable 621. In other embodiments, output connector 616 is adjacent to body 623 and can be coupled directly to the second electrical device or coupled through a detachable cable.

In the same or a different embodiment, output connector 616 includes a removable tip portion 619. Tip portion 619 can be removed and replaced with other DC tip portions. In one embodiment, tip portion 619 is also capable of detecting specific amount of direct current used by the second electrical device and converting the direct current received from power connector 612 or power component 150 to the proper current. For example, power connector 612 can supply two volt direct current and tip portion can detect that the second electrical device uses one volt direct current and convert the two volt direct current into one volt direct current. The mechanism and/or electrical circuitry used to detect the direct current used by the second electrical device and the covert the direct current is well-know in the art and will not be depicted or discussed herein. In an alternative embodiment, the mechanism or electrical circuitry to detect the direct current used by the second electrical device and the covert the direct current is located in body 623.

In one embodiment, input connector 617 can be removably coupled to an AC power source and provide AC power to power component 150. Power component 150 can covert the AC power received through input connector 617 to the direct current used by the second electrical device and output the direct current to the second electrical device. In the illustrated embodiment, input connector 617 is coupled to body 623 through a cable 618. In other embodiments, input connector 617 is on to body 623 and can be directly coupled to power sources or coupled through a detachable cable.

In one embodiment, USB connector 615 can be identical or substantially similar to USB connector 215 (FIG. 2). In one example, power component 150 receives DC power from a power source through USB connector 615, converts the DC power to the direct current used by the second electrical device, and outputs the direct current to the second electrical device. In another embodiment, power component 150 receives power though USB connector 615 and provides the DC power through power connector 612 to storage component 110 (FIG. 2) or power component 130 (FIG. 4). In yet another embodiment, USB connector 615 is capable of outputting direct current to a third electrical device.

In alternative embodiment, power component 150 includes output connector 616 and not USB connector 615. In a further embodiment, power component 150 includes USB connector 615 and not output connector 616.

Figure 7:
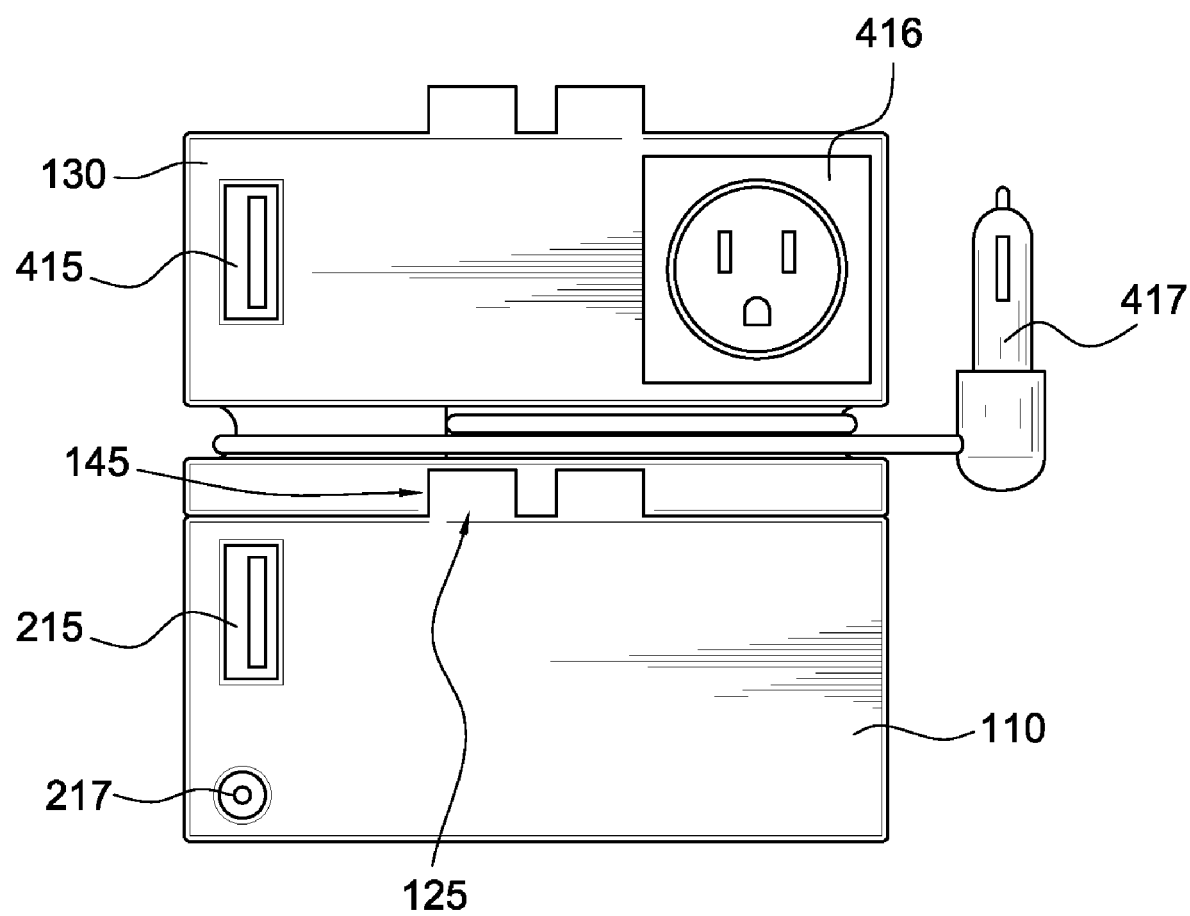
FIG. 7 illustrates a front view of the electrical charge storage component of FIG. 1 removably coupled to the first power components of FIG. 1, according to an embodiment.

FIG. 7 illustrates a front view of storage component 110 removably coupled to power component 130, according to an embodiment. In this embodiment, coupling mechanism 125 is removably coupled to coupling mechanism 145. That is, power connector 211 (FIG. 2) is electrically coupled to power connector 412 (FIG. 4) and connecting heads 226 and 227 (FIG. 2) are physically coupled to receiving portions 428 and 429 (FIG. 4), respectively. Storage component 110 can provide DC power to power component 130 through power connector 211 (FIG. 2). The DC power provided by storage component 110 is the power output by storage component 110 and the power received by the power component 130. In one example, power component 130 converts the DC power received from storage component 110 into the alternating current output to the first electrical device.

In the same or a different example, input connector 417 is coupled to a power source. The direct power received by power component 130 though input connector 417 can be used to recharge storage component 110. The direct power can be provided to storage component 110 through power connector 211 (FIG. 2) and power connector 412 (FIG. 4). In another example, the direct power received through input connector 417 can be converted to alternating current by power component 130 and provided to the first electrical device through output connector 416.

In a further example, either USB connector 215 or 415 can be coupled to a power source. The direct power received by either USB connector 215 or 415 can be used to recharge storage component 110 or converted to alternating current by power component 130 and provided to the first electrical device.

In still yet another example, input connector 217 can be coupled to a power source. In this example, storage component 110 can provide the direct power from the power source to power component 130 through power connector 211 (FIG. 2) and power connector 412 (FIG. 4). Power component 130 can covert the DC power to alternating current and provide the alternating current to the first electrical device.

Figure 8:
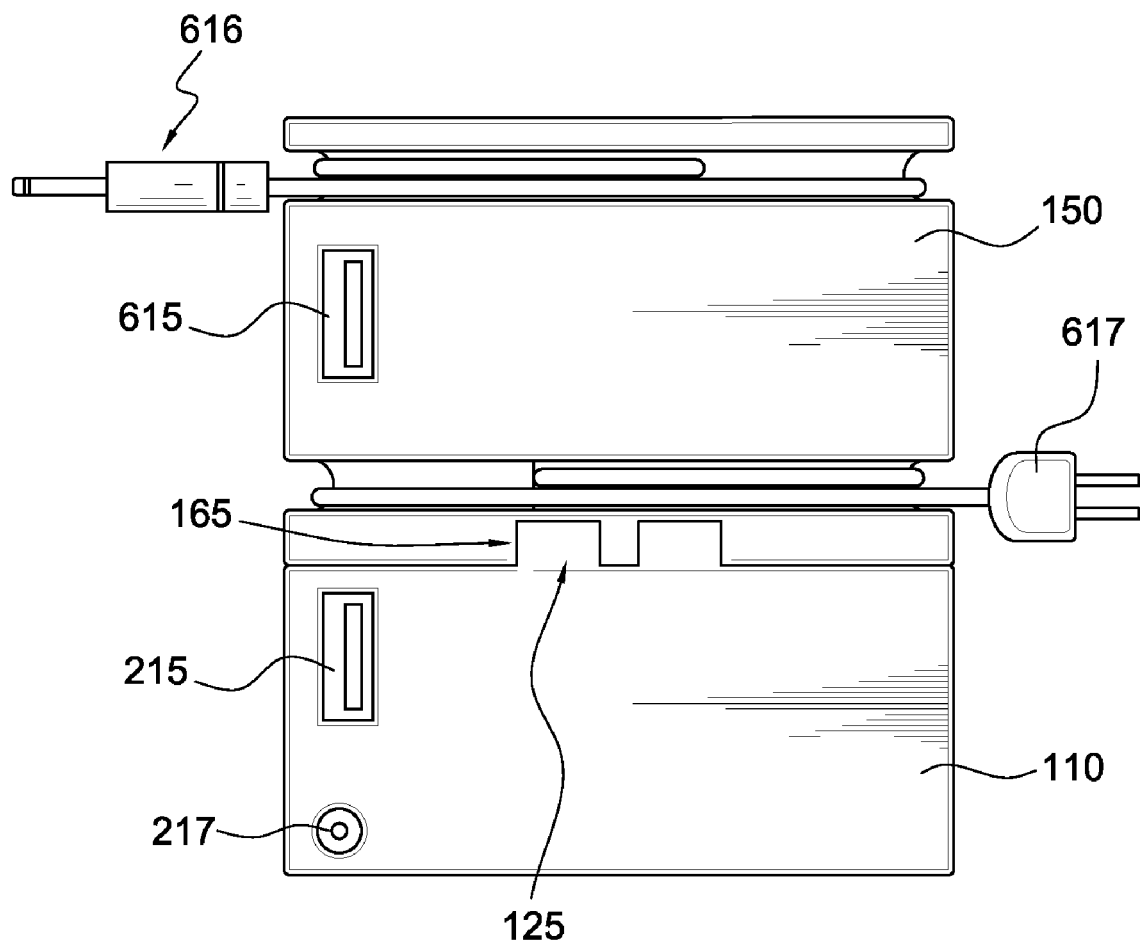
FIG. 8 illustrates a front view of the electrical charge storage component of FIG. 1 removably coupled to the second power component of FIG. 1, according to an embodiment.

FIG. 8 illustrates a front view of storage component 110 removably coupled to power component 150, according to an embodiment. In this embodiment, coupling mechanism 125 is removably coupled to coupling mechanism 165. That is, power connector 211 (FIG. 2) is electrically coupled to power connector 612 (FIG. 6) and connecting heads 226 and 227 (FIG. 2) are physically coupled to receiving portions 638 and 639 (FIG. 6), respectively.

Storage component 110 can provide DC power to power component 150 through power connector 211 (FIG. 2). The DC power provided by storage component 110 is the power output by storage component 110 and the power received by the power component 150. In one example, the DC power provided by storage component 110 is the power stored in storage component 110. In another example, USB connector 215 or input connector 217 is coupled to a power source and the power provided by storage component 110 is the power received through USB connector 215 or input connector 217. Power component 150 can convert the DC power received through power connector 612 (FIG. 6) to the direct current required by the second electrical device and output the direct current to the second electrical device.

In a further example, power component 150 provides DC power to storage component 110 through power connectors 211 (FIG. 2) and 612 (FIG. 6). The DC power provided to storage component 110 can be used to recharge the electrical storage component. In one embodiment, USB connector 615 or input connector 617 is coupled to a power source and the power provided by power component 150 is the power received through USB connector 615 or input connector 617. In yet another embodiment, USB connectors 215 or 615 can output DC power to a third electrical device.

Figure 9:
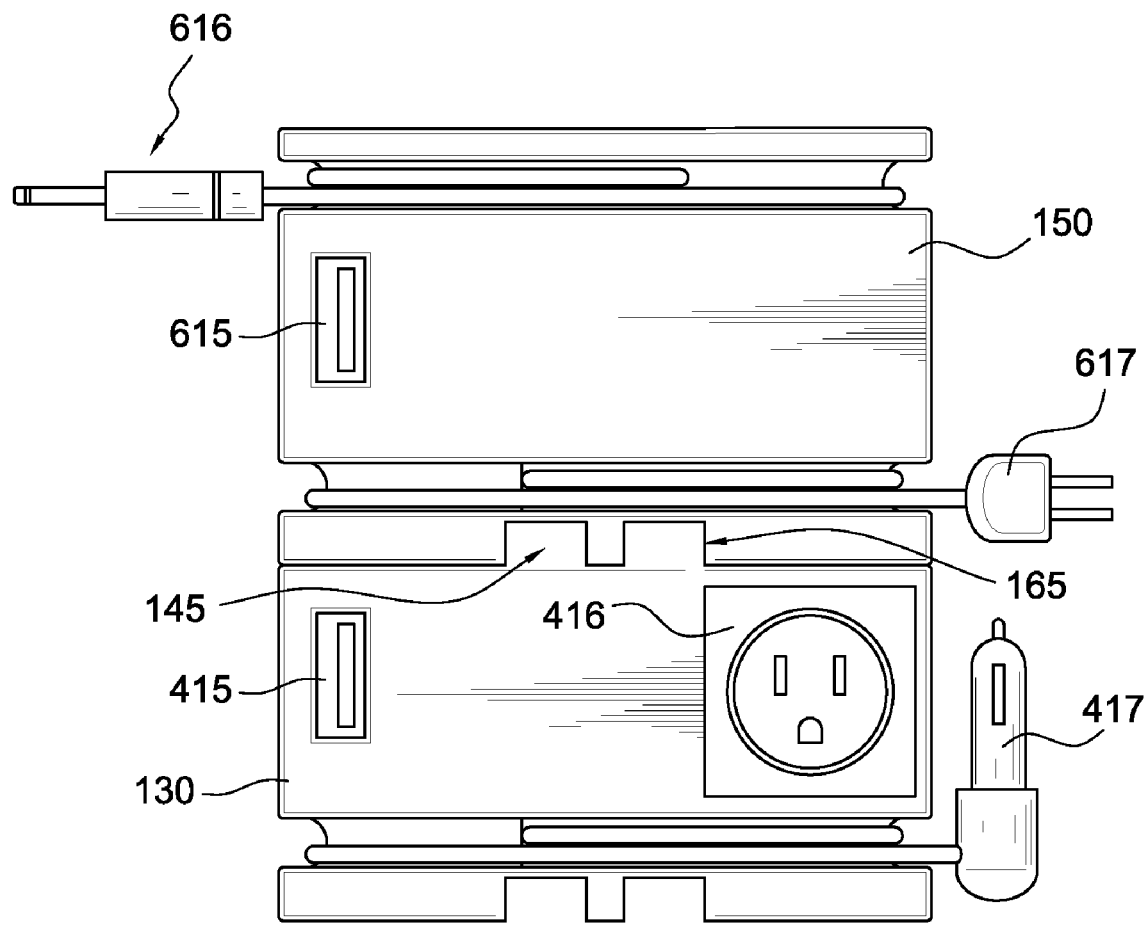
FIG. 9 illustrates a front view of the first power component of FIG. 1 removably coupled to the second power component of FIG. 1, according to an embodiment.

FIG. 9 illustrates a front view of power component 130 removably coupled to power component 150, according to an embodiment. In this embodiment, coupling mechanism 145 is removably coupled to coupling mechanism 165. That is, power connector 411 (FIG. 4) is electrically coupled to power connector 612 (FIG. 6) and receiving portions 638 and 639 (FIG. 6) are physically coupled to connecting heads 426 and 427 (FIG. 4), respectively.

Power component 130 is capable of outputting power to power component 150 through power connectors 411 (FIG. 4). In one example, power component 130 provides DC power to power component 150 through power connectors 411 (FIG. 4). The DC power provided by power component 130 is the power output by power component 130 and the power received by power component 150.

In one embodiment, power component 130 receives power through input connector 417 or USB connector 415 and outputs the power to power component 150 through power connectors 411 (FIG. 4) and 612 (FIG. 6). In the same or a different embodiment, power component 150 can convert the DC power received through power connector 612 (FIG. 6) to the direct current required by the second electrical device and output the power to the second electrical device through output connector 416. In another example, the power is output to the third electrical device through USB connector 415.

In a non-illustrated embodiment, coupling mechanism 165 (FIG. 6) includes one or more connecting heads with one or more power connectors on the connecting heads. In this embodiment, power component 150 is removably coupled to power component 130. That is, the connecting heads on power component 150 are physically coupled to receiving portions 428 and 429 (FIG. 4). The power connectors on the connecting heads are electrically coupled to power connector 412 (FIG. 4). In this embodiment, power component 150 provides DC power to power component 130 through the power connectors on the connecting heads. The DC power provided by power component 150 is the power output by power component 150 and the power received by power component 130. In one example, power component 130 converts the DC power received from power component 150 into the alternating current output to the first electrical device.

In another non-illustrated embodiment, coupling mechanism 125 (FIG. 2) can include one or more receiving portions and one or more second power connectors. In one example, the receiving portions on storage component 110 (FIG. 2) can be identical or substantially similar to receiving portions 428 and 429 (FIG. 4) or receiving portions 638 and 639 (FIG. 6). In the same or a different embodiment, the connecting heads on storage component 110 (FIG. 2) can include one or more power connectors identical or substantially similar to power connectors 412 (FIG. 4) or 612 (FIG. 6). In this embodiment, storage component 110 (FIG. 2) is further capable of receiving power through the second power connectors from power component 130 (FIG. 4) or power component 150 (FIG. 6). In one example, the power can be used to recharge storage component 110 (FIG. 2). In the same or a different embodiment, the power can also be outputted the first or second device through power components 130 (FIG. 4) or 150 (FIG. 6), respectively.

Figure 10:
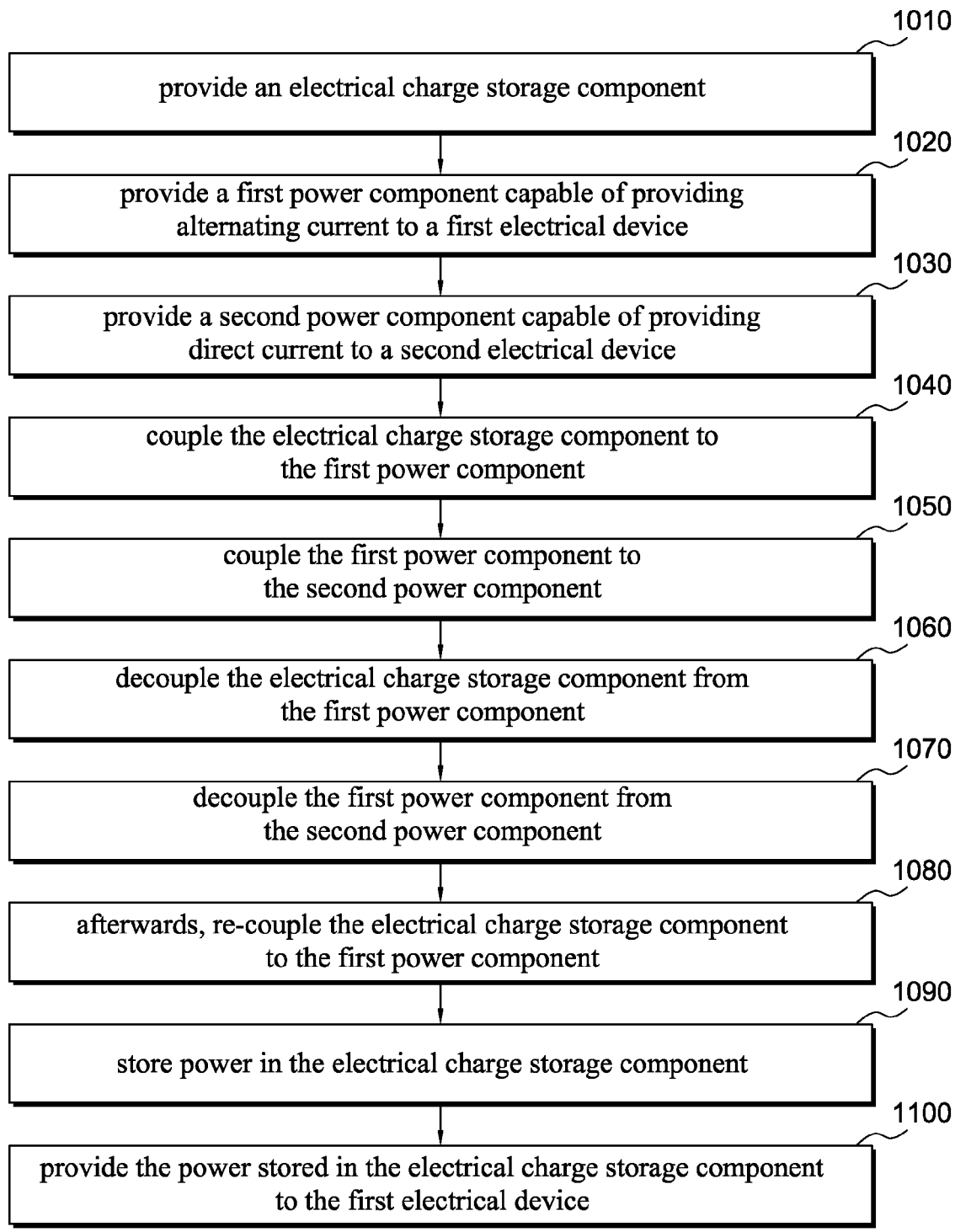
FIG. 10 illustrates a flow chart for method of using an electrical component, according to an embodiment.

FIG. 10 illustrates a flow chart 1000 for a method of using an electrical component, according to an embodiment. Flow chart 1000 in FIG. 10 includes a step 1010 of providing an electrical charge storage component. As an example, the electrical charge storage component can be similar to storage component 110 of FIG. 2.

Flow chart 1000 in FIG. 10 continues with a step 1020 of providing a first power component capable of providing alternating current to a first electrical device. As an example, the first power component can be similar to power component 130 of FIG. 4.

Subsequently, flow chart 1000 in FIG. 10 includes a step 1030 of providing a second power component capable of providing direct current to a second electrical device. As an example, the second power component can be similar to power component 150 of FIG. 6.

Next, flow chart 1000 in FIG. 10 includes a step 1040 of coupling the electrical charge storage component to the first power component. In one example, the electrical charge storage component can be removably coupled to the first power component by coupling together coupling mechanisms on the electrical charge storage component and the first power component. In one embodiment, the coupling mechanisms on the electrical charge storage component and the first power component can be similar to coupling mechanisms 125 and 145 of FIGS. 2 and 4, respectively.

Flow chart 1000 in FIG. 10 continues with a step 1050 of coupling the first power component to the second power component. In one example, the first power component can be removably coupled to the second power component by coupling together coupling mechanisms on the first component and the second power component. In one embodiment, the coupling mechanisms on the first component and the second power component can be similar to coupling mechanisms 145 and 165 of FIGS. 4 and 6, respectively.

In some embodiments, flow chart 1000 in FIG. 10 includes a step 1060 of decoupling the electrical charge storage component from the first power component. In one example, the electrical charge storage component can be decoupled from the first power component by decoupling the coupling mechanism on the electrical charge storage component from the coupling mechanism the first power component.

In the same or a different embodiment, flow chart 1000 in FIG. 10 includes a step 1070 of decoupling the first power component from the second power component. In one example, the first power component can be decoupled from the second power component by decoupling the coupling mechanism on the first power component from the coupling mechanism on the second power component.

In some embodiments after performing step 1070, flow chart 1000 in FIG. 10 can include a step 1080 of re-coupling the electrical charge storage component to the first power component. In one example, step 1080 can be similar to step 1040.

In a non-illustrated alternative to step 1080, flow chart 1000 in FIG. 10 can include a step 1085 of coupling the electrical charge storage component to the second power component after performing steps 1060 and 1070. In one example, the electrical charge storage component can be removably coupled to the second power component by coupling the coupling mechanisms on the electrical charge storage component and the second power component.

In some embodiments, flow chart 1000 in FIG. 10 can include a step 1090 of storing power in the electrical charge storage component. In one embodiment, power can be transferred to the electrical charge storage component by coupling an input connector to a power source or receiving power from the first or second power component through a power connector on the electrical charge storage component. In one example, the input connector on the electrical charge storage component can be similar to input connector 217 of FIG. 2. The power connector on the electrical charge storage component can be similar to power connector 211 of FIG. 2.

In the same or a different embodiment after step 1090, flow chart 1000 in FIG. 10 can further include a step 1100 of providing the power stored in the electrical charge storage component to the first electrical device. In one example, the electrical charge storage component can be removably coupled to the first power component and power can be output from the electrical charge storage component to the first power component through the coupling mechanisms on the electrical charge storage component and the first power component. In this example, the first power component can then convert the power received from the electrical charge storage component to alternating current, and output the alternating current to the first electrical device. In a non-illustrated embodiment, after 1090, flow chart 1000 in FIG. 10 includes a step 1110 of providing the power stored in the electrical charge storage component to the second electrical device. In one example, the electrical charge storage component can be removably coupled to the first power component and the first power component can be removably coupled to the second power component. In this example, the electrical power component outputs power to the first power component through the coupling mechanisms on the electrical charge storage component and the first power component. Likewise, the first power component outputs the power received from the electrical charge storage component to the second power component through the coupling mechanisms on the first power component and the second power component. After receiving the power, the second power component can convert the power into the direct current used by the second electrical device.

In an alternative example, the second power component can be coupled directly to the electrical charge storage component and the power can be output from the electrical charge storage component to the second power component through the coupling mechanisms on the electrical charge storage component and the second power component.

Although the invention has been described with reference to specific embodiments, it will be understood by those skilled in the art that various changes may be made without departing from the spirit or scope of the invention. For example, to one of ordinary skill in the art, it will be readily apparent that the various connectors can be replaced with other types of connectors. For example, the USB connectors can be replaced with FireWire connectors. In another example, step 1090 of flow chart 1000 in FIG. 10 can occur after any of the steps 1010-1080. Additional examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims.

For example, to one of ordinary skill in the art, it will be readily apparent that the system discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment of the invention, and may disclose alternative embodiments of the invention.

All elements claimed in any particular claim are essential to the invention claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A modular power supply comprising:
   an electrical charge storage component comprising one or more first power connectors;
   a first power component outputting alternating current to a first electrical device and comprising one or more second power connectors and one or more fourth power connectors; and
   a second power component outputting direct current to a second electrical device and comprising one or more third power connectors,
   wherein:
   the electrical charge storage component provides power to the first power component through the one or more first power connectors at least partially when the one or more first power connectors are removably coupled to the one or more second power connectors;
   the electrical charge storage component provides power to the second power component through the one or more first power connectors at least partially when the one or more first power connectors are removably coupled to the one or more third power connectors;
   the first power component provides power to the electrical charge storage component through the one or more second power connectors at least partially when the one or more second power connectors are removably coupled to the one or more first power connectors;
   the first power component provides power to the second component through the one or more fourth power connectors at least partially when the one or more fourth power connectors are removably coupled to the one or more third power connectors;
   the second component provides power to the electrical charge storage component through the one or more third power connectors at least partially when the one or more third power connectors are removably coupled to the one or more first power connectors; and
   the second component provides power to the first component through the one or more third power connectors at least partially when the one or more third power connectors are removably coupled to the one or more fourth power connectors.

2. The modular power supply of claim 1, wherein:
   the second power component comprises an adapter converting additional alternating current into the direct current.

3. The modular power supply of claim 1, wherein:
   the first power component comprises an inverter converting additional direct current into the alternating current.

4. The modular power supply of claim 1, wherein:
   the electrical charge storage component further comprises one or more universal serial bus connectors outputting additional direct current to a third electrical device.

5. The modular power supply of claim 1, wherein:
   the first power component further comprises one or more universal serial bus connectors outputting additional direct current to a third electrical device.

6. The modular power supply of claim 1, wherein:
   the second power component further comprises:
   one or more universal serial bus connectors outputting the direct current to the second electrical device; and
   one or more direct current output connectors capable of outputting additional direct current to a third electrical device.

7. The modular power supply of claim 1, wherein:
the electrical charge storage component comprises one or more input connectors receiving power from a power source to recharge the electrical charge storage component.

8. The modular power supply of claim 1, wherein:
the first power component comprises one or more input connectors receiving additional direct current from a power source.

9. The modular power supply of claim 1, wherein:
the second power component comprises one or more input connectors receiving additional alternating current from a power source.

10. The modular power supply of claim 1, wherein:
the electrical charge storage component comprises one or more connecting heads; and
the one or more connecting heads removably couple the electrical charge storage component to the first power component and the second power component at different times.

11. The modular power supply of claim 10, wherein:
at least one or more first power connectors is located adjacent to at least one of the one or more connecting heads.

12. The modular power supply of claim 10, wherein:
the first power component comprises one or more receiving portions; and
the one or more receiving portions are removably coupled to the one or more connecting heads.

13. The modular power supply of claim 12, wherein:
at least one of the one or more first power connectors is located adjacent to at least one of the one or more connecting heads;
at least one of the one or more second power connectors is located adjacent to at least one of the one or more receiving portions; and
when the one or more receiving portions are removably coupled to the one or more connecting heads, the at least one of the one or more first power connectors adjacent to the at least one of the one or more connecting heads is self-aligned to be electrically coupled to the at least one of the one or more second power connectors adjacent to the at least one of the one or more receiving portions.

14. The modular power supply of claim 10, wherein:
the second power component comprises one or more receiving portions; and
the one or more receiving portions are removably coupled to the one or more connecting heads.

15. The modular power supply or claim 14, wherein:
at least one of the one or more first power connectors is located adjacent to at least one of the one or more connecting heads;
at least one of the one or more third power connectors is located adjacent to at least one of the one or more receiving portions; and
when the one or more receiving portions are removably coupled to the one or more connecting heads, the at least one of the one or more first power connectors adjacent to the at least one of the one or more connecting heads is self-aligned to be electrically coupled to the at least one of the one or more third power connectors adjacent to the at least one of the one or more receiving portions.

16. The modular power supply of claim 1, wherein:
the first power component comprises one or more connecting heads; and
the one or more connecting heads removably couple the first power component to the second power component.

17. The modular power supply of claim 16, wherein:
the second power component comprises one or more receiving portions; and
the one or more receiving portions removably couple to the one or more connecting heads.

18. The modular power supply of claim 17, wherein:
at least one of the one or more fourth power connectors is located adjacent to one of the one or more connecting heads;
at least one of the one or more third power connectors is located adjacent to one of the one or more receiving portions; and
when the one or more receiving portions are removably coupled to the one or more connecting heads, the at least one of the one or more fourth power connectors adjacent to the one of the one or more connecting heads is self-aligned to be electrically coupled to the at least one of the one or more third power connectors adjacent to the one of the one or more receiving portions.

19. A modular power supply for providing power comprising:
an adapter converting a first alternating current to a first direct current and electrically coupled to a first electrical device;
an inverter converting a second direct current into a second alternating current and electrically coupled to a second electrical device; and
a battery;
wherein:
the battery provides power to the adapter at least partially when the battery is electrically and physically removably coupled to the adaptor;
the battery provides power to the inverter at least partially when the battery is electrically and physically removably coupled to the inverter;
the inverter provides power to the adapter at least partially when the inverter is electrically and physically removably coupled to the adapter;
the inverter provides power to the battery at least partially when the inverter is electrically and physically removably coupled to the battery;
the adapter provides power to the battery at least partially when the inverter is electrically and physically removably coupled to the battery;
the adapter provides power to the inverter at least partially when the adapter is electrically and physically removably coupled to the inverter.

20. The modular power supply of claim 19, wherein:
the inverter receives the second direct current from a power source and converts the second direct current into the second alternating current and provides the second alternating current to the second electrical device.

21. The modular power supply of claim 19, wherein:
the adapter receives the first alternating current from a power source and converts the first alternating current into the first direct current and provides the first direct current to the first electrical device.

22. The Modular power supply of claim 19, wherein:
the battery comprises a first coupling mechanism;
the inverter comprises a second coupling mechanism; and
the adapter comprises a third coupling mechanism,
wherein:
the second coupling mechanism is removably coupled to the first coupling mechanism and the third coupling mechanism at different times; and the third coupling mechanism is removably coupled to the first coupling mechanism and the second coupling mechanism at different times.

23. A method of using a modular power supply comprising:
providing an electrical charge storage component;
providing a first power component that provides alternating current to a first electrical device;
providing a second power component that provides direct current to a second electrical device;
removably coupling the electrical charge storage component to the first power component so that the electrical charge storage component provides power to the first power component at a first time and the first power component provides power to the electrical charge storage component at a second time;
removably coupling first power component to the second power component so that the first power component provides power to the second power component at a third time and the second power component provides power to the first power component at a fourth time; and
removably coupling the electrical charge storage component to the second power component so that the electrical charge storage component provides power to the second power component at a fifth time and the second power component provides power to the electrical charge storage component at a sixth time.

24. The method of claim 17, further comprising:
storing power in the electrical storage component; and
providing the power stored in the electrical charge storage component to the first electrical device.

25. storing power in the electrical storage component; and
providing the power stored in the electrical charge storage component to the second electrical device.

26. A modular power supply comprising:
an electrical charge storage component comprising one or more first power connectors;
a first power component outputting alternating current to a first electrical device and comprising one or more second power connectors; and
a second power component outputting direct current to a second electrical device and comprising one or more third power connectors and one or more fourth power connectors,
wherein:
the electrical charge storage component provides power to the first power component through the one or more first power connectors at least partially when the one or more first power connectors are removably coupled to the one or more second power connectors;
the electrical charge storage component provides power to the second power component through the one or more first power connectors at least partially when the one or more first power connectors are removably coupled to the one or more third power connectors;
the first power component provides power to the electrical charge storage component through the one or more second power connectors at least partially when the one or more second power connectors are removably coupled to the one or more first power connectors;
the first power component provides power to the second component through the one or more second power connectors at least partially when the one or more second power connectors are removably coupled to the one or more fourth power connectors;
the second component provides power to the electrical charge storage component through the one or more third power connectors at least partially when the one or more third power connectors are removably coupled to the one or more first power connectors; and
the second component provides power to the first component through the one or more fourth power connectors at least partially when the one or more fourth power connectors are removably coupled to the one or more second power connectors.

27. The modular power supply of claim 26, wherein:
the second power component comprises an adapter converting additional alternating current into the direct current.

28. The modular power supply of claim 26, wherein:
the first power component comprises an inverter converting additional direct current into the alternating current.

29. The modular power supply of claim 26, wherein:
the electrical charge storage component further comprises one or more universal serial bus connectors outputting additional direct current to a third electrical device.

30. The modular power supply of claim 26, wherein:
the first power component further comprises one or more universal serial bus connectors outputting additional direct current to a third electrical device.

31. The modular power supply of claim 26, wherein:
the second power component further comprises:
one or more universal serial bus connectors outputting the direct current to the second electrical device; and
one or more direct current output connectors capable of outputting additional direct current to a third electrical device.

32. The modular power supply of claim 26, wherein:
the electrical charge storage component comprises one or more input connectors receiving power from a power source to recharge the electrical charge storage component.

33. The modular power supply of claim 26, wherein:
the first power component comprises one or more input connectors receiving additional direct current from a power source.

34. The modular power supply of claim 26, wherein:
the second power component comprises one or more input connectors receiving additional alternating current from a power source.

35. The modular power supply of claim 26, wherein:
the electrical charge storage component comprises one or more connecting heads; and
the one or more connecting heads removably couple the electrical charge storage component to the first power component and the second power component at different times.

36. The modular power supply of claim 35, wherein:
at least one or more first power connectors is located adjacent to at least one of the one or more connecting heads.

37. The modular power supply of claim 35, wherein:
the second power component comprises one or more receiving portions; and
the one or more receiving portions are removably coupled to the one or more connecting heads.

38. The modular power supply of claim 37, wherein:
at least one of the one or more first power connectors is located adjacent to the at least one of the one or more connecting heads;
at least one of the one or more third power connectors is located adjacent to at least one or the one or more receiving portions; and when the one or more receiving portions are removably coupled to the one or more connecting heads, the at least one of the one or more first power connectors adjacent to the at least one of the one or more connecting heads is self-aligned to be electrically coupled to the at least one of the one or more third power connectors adjacent to the at least one of the one or more receiving portions.

39. The modular power supply of claim 35, wherein:
the first power component comprises one or more receiving portions; and
the one or more receiving portions are removably coupled to the one or more connecting heads.

40. The modular power supply of claim 39, wherein:
at least one of the one or more first power connectors is located adjacent to at least one of the one or more connecting heads;
at least one of the one or more second power connectors is located adjacent to at least one or the one or more receiving portions; and
when the one or more receiving portions are removably coupled to the one or more connecting heads, the at least one of the one or more first power connectors adjacent to the at least one of the one or more connecting heads is self-aligned and electrically coupled to the at least one of the one or more second power connectors adjacent to the at least one of the one or more receiving portions.

41. The modular power supply of claim 26, wherein:
the second power component comprises one or more connecting heads; and
the one of more connecting heads removably couple the second power component to the first power component.

42. The modular power supply of claim 41, wherein:
the first power component comprises one or more receiving portions; and
the one or more receiving portions are removably coupled to the one or more connecting heads.

43. The modular power supply of claim 42, wherein:
at least one of the one or more fourth power connectors is located adjacent to the at least one of the one or more connecting heads;
at least one of the one or more second power connectors is located adjacent to at least one or the one or more receiving portions; and
when the one or more receiving portions are removably coupled to the one or more connecting heads, the at least one of the one or more fourth power connectors adjacent to the at least one of the one or more connecting heads is self-aligned to be electrically coupled to the at least one of the one or more second power connectors adjacent to the at least one of the one or more receiving portions.

* * * * *

UNITED STATES PATENT AND TRADEMARK OFFICE
CERTIFICATE OF CORRECTION

PATENT NO. : 7,626,356 B2
APPLICATION NO. : 11/650021
DATED : December 1, 2009
INVENTOR(S) : Elgie et al.

It is certified that error appears in the above-identified patent and that said Letters Patent is hereby corrected as shown below:

At column 14, line 59, delete "Modular" and insert --modular--.

At column 15, line 31, before "storing power" insert --The method of claim 23, further comprising:--.

Signed and Sealed this

Thirtieth Day of March, 2010

David J. Kappos
*Director of the United States Patent and Trademark Office*